United States Patent [19] — Chang

[11] 4,204,616

[45] May 27, 1980

[54] ADJUSTABLE SAFETY GUIDE FOR SKELETON TYPE CAULKING GUN

[76] Inventor: Peter J. Y. Chang, 7700 Tremayne Pl., McLean, Va. 22102

[21] Appl. No.: 27,000

[22] Filed: Apr. 4, 1979

[51] Int. Cl.$^2$ .............................................. G01F 1/00

[52] U.S. Cl. .................................... 222/391; 222/327; 222/386; 248/311.1 R

[58] Field of Search ............ 248/311.1 R, 313, 309 R; 222/325, 326, 327, 390, 391, 173; 401/132, 182, 176, 179

[56] References Cited

U.S. PATENT DOCUMENTS

| | | | |
|---|---|---|---|
| 1,709,445 | 4/1929 | Tomes | 222/327 X |
| 2,833,444 | 5/1958 | Sherbondy | 222/326 X |
| 3,884,439 | 5/1975 | Jeninga | 248/311.1 R |
| 4,072,254 | 2/1978 | Cox | 222/391 |

FOREIGN PATENT DOCUMENTS

| | | | |
|---|---|---|---|
| 729564 | 5/1955 | United Kingdom | 222/391 |

*Primary Examiner*—David A. Scherbel
*Attorney, Agent, or Firm*—John F. McClellan, Sr.

[57] ABSTRACT

An adjustable safety guide for a skeleton type caulking gun having an end-ring held against the thrust of a trigger-driven push rod by an open-frame of upper and lower arms. The adjustable safety guide automatically prevents a cartridge from accidentally dropping through the open frame during loading operations while preserving access from both the left hand side and the right hand side of the caulking gun; it comprises a flexible half-sleeve reaching longitudinally along the open frame with the upper and lower margins respectively looped around the upper and the lower arms in the preferred securance.

6 Claims, 5 Drawing Figures

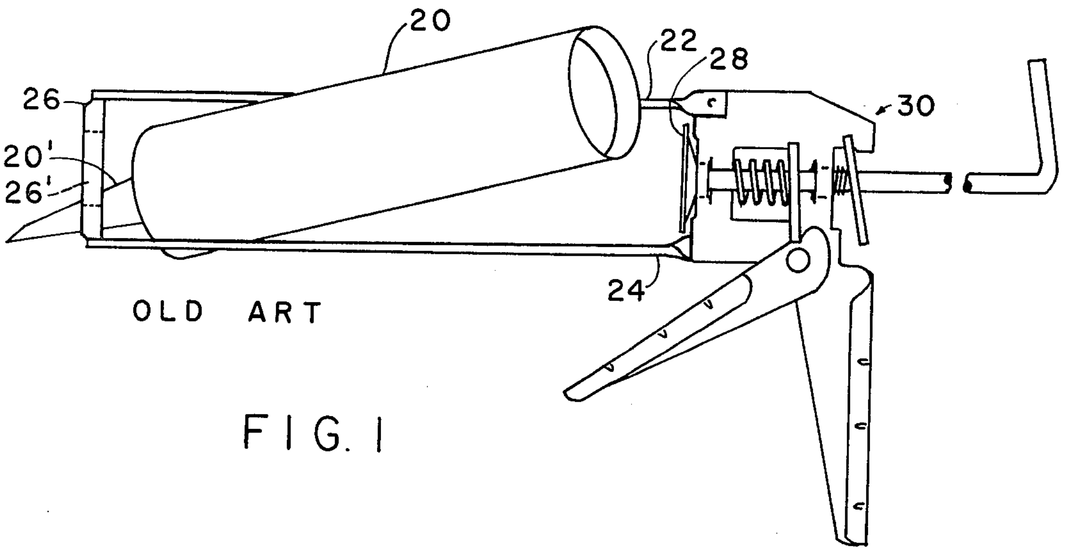
FIG. 1
FIG. 2
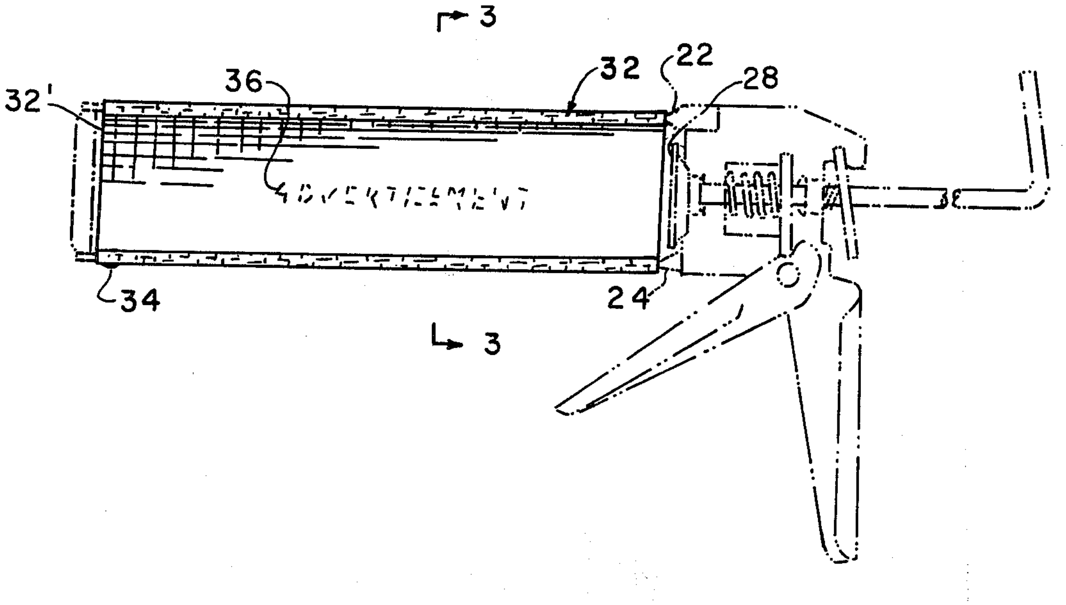

ADJUSTABLE SAFETY GUIDE FOR SKELETON TYPE CAULKING GUN

This invention relates generally to caulking guns and specifically to cartridge-loaded caulking guns.

In the prior art loading guides are known for the type caulking gun having a combination rigid tension arm and loading guide in the form of an upwardly open rigid trough connecting the end retainer for a cartridge with the thrust mechanism, typically a trigger-drive rod and handle mechanism.

Such closed-frame type caulking guns being loaded from the top are equally usable by right hand and by left hand workmen, and the danger of dropping a heavy, sharp-pointed refill cartridge being loaded is less than through the open frame of a skeleton type caulking gun which is loaded laterally from either side between upper and lower arms supporting the cartridge end-retainer to the drive mechanism.

Loading can be somewhat awkward and, depending on whether the user is lefthanded or righthanded, takes place from the left or right. Typically, the user tilts the gun for better access, increasing the danger of dropping the cartridge through the frame.

Even when dropped on the foot a loaded cartridge can produce injury; when dropped from a scaffolding or ladder the lethal potential of the sharp point is evident.

In spite of the hazard noted, the so-called skeleton type cartridge gun has found a market in some foreign countries where product litigation and safety regulations are less threatening to the manufacture than in the United States.

A principal object of the present invention therefore is to provide a safety guide which automatically adjusts for lefthanded or righthanded loading to prevent cartridges from dropping through the frame of a skeleton type caulking gun, regardless of whether the gun is tipped or not tipped in loading.

Further objects are to provide a safety guide as described which is economical and durable, which is easy to learn to use and easy to use, which is lighter in weight than rigid metal guides for caulking guns, and in which safety instructions on the guide can be observed equally well by either righthanded or lefthanded users.

In brief summary given as cursive description only and not as limitation, the safety guide of this invention includes a flexible sheet member secured to arms of a skeleton type caulking gun in a manner automatically guarding against dropping a cartridge therebetween while permitting cartridge loading from either side.

The above and other objects and advantages of this invention will become more readily apparent on examination of the following description, including the drawings, in which like reference numerals refer to like parts:

FIG. 1 is a side elevational view of old art showing the problem of loading;

FIG. 2 is a side elevational view showing one embodiment of the solution to the problem.

THE PROBLEM

Figure 3:
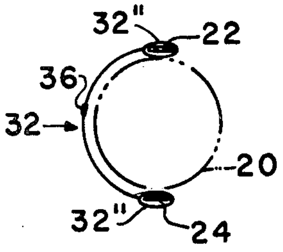
FIGS. 3, 4 and 5 are sectional diagrammatic details adapted from 3—3, FIG. 2.

FIG. 1 shows the problem. It can occur in any loading of a cartridge 20 between upper arm 22 and lower arm 24 which define the open frame between end retainer 26 and thrust end 28 of the plunger of any typical lightweight, skeleton-type caulking gun 30. Such guns are characterized by this over-and-under structure.

The operator only has two hands; one holds the cartridge and the other holds the caulking gun at the handle or actuating mechanism end.

A moment's carelessness or distraction of the operator may cause the pointed end or nozzle 20' of the cartridge to miss when thrust at the opening 26' in the end retainer and when the hand holding it is shifted to line up the rear with the plunger, to fall through the open frame onto whatever may be below, point down.

Because some operators load from the left, some from the right, and some tip the caulking gun, to load, conventional fixed-trough guards would restrict operation and add unnecessarily to the weight of the assembly.

THE SOLUTION

FIG. 2 shows the solution provided by the present invention, which automatically relieves the cartridge dropthrough hazard regardless of from which side of the caulking gun the cartridge is inserted. The gun is shown in phantom.

A flexible-panel guard 32, which may be of canvas or of other lightweight, pliable, durable and low-cost sheeting such as "Mylar" sheeting, is secured along respective first and second edges to the respective upper and lower arms 22, 24 of the caulking gun. The edges may be looped loosely around the arms, the loops being formed by sewing or cementing, or other appropriate structure may be used, such being known in the art.

Enough slack is provided for the guard to fit as a half-sleeve around one side of a standard size cartridge installed in the caulking gun from either side.

The nozzle end 32' of the guard should be located close enough to touch or almost to touch the caulking gun end retainer. (The end retainer or thrust ring may be washer-shape or horseshoe shape or any other conventional configuration).

The guard length preferably should extend back nearly to the retracted position of the plunger end 28, although it may be shorter. A rivet 34 through the guard and an arm, of other convenient means preferably should be used to prevent the sleeve from sliding on the arms, particularly if a relatively short sleeve is used.

Both sides of the guard may bear an advertisement or a safety message 36 because one side of the half sleeve shape is always clearly visible to the operator, regardless of from which side he loads and unloads cartridges as the next Figures indicate.

FIG. 3 shows in section the guard 32 contoured to the right side of a caulking gun, the upper and lower arms being shown at 22, 24, with guard loops at 32" around them, indicia being indicated at 36. A cartridge 20 (phantom line) was inserted from the left side of the caulking gun and is indicated in operating position.

Figure 4:
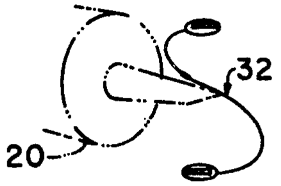

FIG. 4 in a similar view shows how on insertion of a cartridge 20 in the caulking gun from the opposite or right side, the cartridge nozzle automatically pushes the flexible guard structure 32 toward the left-hand proper position.

Figure 5:
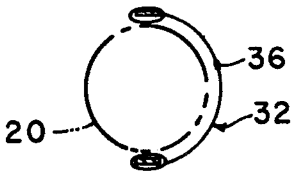

FIG. 5 shows the next position, the half sleeve shape of the guard 32 fully formed around and holding the cartridge 20 which is fully in right-hand-loaded operating position; the indicia 36 on the left hand side of the guard is now visible.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a caulking gun of the type having a thrust ring for retaining the nozzle end of a cartridge, a thrust mechanism for ejecting caulking from the cartridge, and, connecting the thrust ring and thrust mechanism, an open frame comprising an upper arm and a lower arm having spacing from the upper arm for receiving a cartridge therebetween from either the left side or the right side of the caulking gun, the improvement comprising: a flexible guide for a cartridge, the flexible guide extending between the upper arm and the lower arm, and means securing the flexible guide respectively at the upper arm and the lower arm with sufficient slack in said flexible guide for forming a half-sleeve around a said received cartridge, the securing means permitting the slack in said flexible guide to be pushed toward either said left side or said right side of the caulking gun for receiving and guiding a cartridge inserted between the upper and lower arms from either said left side or right side of the caulking gun.

2. In a caulking gun as recited in claim 1, the flexible guide extending along at least a portion of said upper and lower arms proximate the thrust ring.

3. In a caulking gun as recited in claim 2, the securing means preventing the flexible guide from sliding along said upper and lower arms.

4. In a caulking gun as recited in claim 1, the flexible guide extending substantially the length of said upper and lower arms.

5. In a caulking gun as recited in claim 1, the securing means including a portion of the flexible guide forming a loop around at least one of said upper arm and lower arm.

6. In a caulking gun as recited in claim 1, indicia on said flexible guide, the indicia positioned for viewing from either said right side or said left side of the caulking gun depending on direction of said reception of a cartridge between said upper and lower arms.

* * * * *